(12) United States Patent
Rodgers et al.

(10) Patent No.: US 11,325,266 B1
(45) Date of Patent: May 10, 2022

(54) BELLOWS VALVE FOR VACUUM SYSTEMS

(71) Applicant: Amazon Technologies, Inc., Seattle, WA (US)

(72) Inventors: Tyler B. Rodgers, Puyallup, WA (US); Jon David DeFant, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 236 days.

(21) Appl. No.: 16/448,867

(22) Filed: Jun. 21, 2019

(51) Int. Cl.
*B25J 15/06* (2006.01)
*B65G 47/91* (2006.01)

(52) U.S. Cl.
CPC ........ *B25J 15/0625* (2013.01); *B65G 47/917* (2013.01); *B65G 47/918* (2013.01)

(58) Field of Classification Search
CPC . B25J 15/0625; B25J 15/0052; B65G 47/917; B65G 47/918
See application file for complete search history.

(56) References Cited

U.S. PATENT DOCUMENTS

| | | | | |
|---|---|---|---|---|
| 4,600,229 A | * | 7/1986 | Oten | B65G 47/91 294/189 |
| 5,609,377 A | * | 3/1997 | Tanaka | B65G 47/918 294/65 |
| 6,131,973 A | * | 10/2000 | Trudeau | B25J 15/0616 294/186 |
| 6,416,274 B2 | * | 7/2002 | Tokuno | A47F 10/06 198/468.4 |
| 2004/0094979 A1 | * | 5/2004 | Damhuis | B25J 15/0052 294/65 |
| 2019/0047158 A1 | * | 2/2019 | Petrovski | B25J 15/0061 |

FOREIGN PATENT DOCUMENTS

DE 102016011618 A1 * 3/2018 .......... B25J 15/0052

* cited by examiner

*Primary Examiner* — Stephen A Vu
(74) *Attorney, Agent, or Firm* — Thomas | Horstemeyer, LLP.

(57) ABSTRACT

A valve for use within a vacuum cup of a vacuum gripping system is described. In one example, a vacuum cup includes a bellows and a valve assembly seated within an inner chamber of the bellows. The valve assembly includes a body disk seated within the inner chamber, a control disk seated toward a suction cup end of the bellows, a spring positioned between the body disk and the control disk, and a control stem extending through the central valve aperture of the body disk, through the spring, and secured to the control disk. When the control stem is seated within the central valve aperture, the valve assembly restricts fluid suction to within the inner chamber. When the valve control stem is unseated from the central valve aperture, the valve assembly conveys fluid suction to the suction cup end of the bellows.

20 Claims, 11 Drawing Sheets

BELLOWS VALVE FOR VACUUM SYSTEMS

BACKGROUND

Vacuum and gripping systems are designed to provide increased productivity through the automation of a number of different tasks. Vacuum systems have also been implemented with various machines, including robotic automation machines, to provide additional flexibility in automations. Together with palletizing robots, gantries, and other automation systems, vacuum systems can increase the output of production and efficiencies in various industries. As examples, vacuum systems can be used for palletizing and de-palletizing various items and goods, repositioning and packing items and goods, and handling heavy and awkward items. Vacuum systems are also particularly well-suited for dangerous, caustic, and extreme environments, where individuals are more subject to discomfort or bodily harm.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

As outlined above, vacuum and gripping systems are designed to provide increased productivity through the automation of a number of different tasks. As examples, vacuum systems can be used for palletizing and de-palletizing various items and goods, repositioning and packing items and goods, and handling heavy and awkward items. Vacuum systems are also particularly well-suited for dangerous, caustic, and extreme environments, where individuals are more subject to discomfort or bodily harm.

Figure 1:
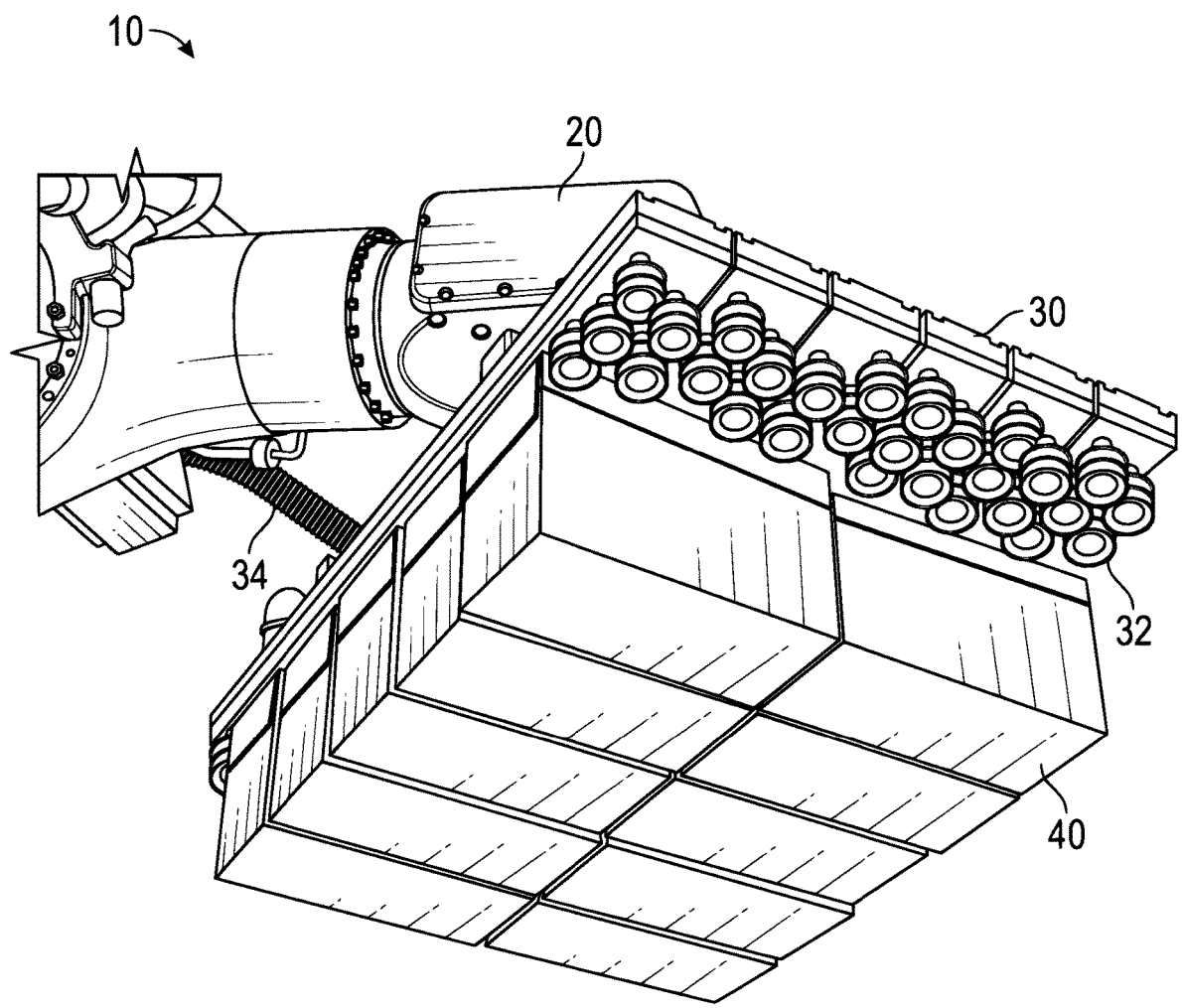
FIG. 1 illustrates an example vacuum system according to various aspects of the embodiments of the present disclosure.

Some vacuum systems rely upon a distributed arrangement of many vacuum cups, arranged in a type of grid. As one example, FIG. 1 illustrates a vacuum system 10 according to various aspects of the embodiments of the present disclosure. Among other components, the vacuum system 10 includes a robotic arm 20. The robotic arm 20 is representative of any type of materials handling robot, gantry robot, or similar robotic automation tool, with any number of degrees of freedom. A panel 30 is affixed to one end of the robotic arm 20, with a number of vacuum cups 32 provided on the panel 30 in a distributed arrangement. The panel 30 can vary in shape and size as compared to that shown in FIG. 1. Additionally, the number and arrangement of the vacuum cups 32 on the panel 30 can vary as compared to that shown. Thus, the vacuum system 10 can include larger, smaller, and alternative arrangements of the vacuum cups 32.

The vacuum system 10 is capable of lifting items, such as the boxes 40, using the suction provided by a vacuum. Particularly, the robotic arm 20 can position the panel 30 to establish light contact between the boxes 40 and the vacuum cups 32. Before or after contact is made, the vacuum system 10 can also provide suction from a vacuum, which passes through the vacuum tube 34 and to the vacuum cups 32. With the application of the suction, the vacuum cups 32 will adhere to the boxes 40, and the robotic arm 20 can lift and move the boxes 40. After the robotic arm 20 has repositioned the boxes 40, the vacuum system 10 can turn the suction from the vacuum off, releasing the boxes 40.

The vacuum system 10 is inefficient in the distribution of the suction from the vacuum, particularly in cases where one or more of the vacuum cups 32 are left open. For example, as shown in FIG. 1, several of the vacuum cups 32 are left open and are not adhered against any of the boxes 40. If the suction from the vacuum is distributed through the panel 30 and across all the vacuum cups 32, the gripping force of the suction provided by the vacuum cups 32 that do make contact with the boxes 40 is diminished by the vacuum cups 32 that are left open. Generally, the effect of leaving some of the vacuum cups 32 open is to "short circuit" the gripping force of the suction provided by the vacuum cups 32 that do make contact with the boxes 40.

In the context of the problems outlined above (and others), a valve for use within a vacuum cup of a vacuum system is described herein. The valve can be placed within one or more of the vacuum cups 32 of the vacuum system 10 shown in FIG. 1, for example, among other vacuum cups of similar vacuum systems. Thus, a vacuum cup according to the embodiments described herein includes a bellows and a valve assembly seated within an inner chamber within the bellows. The valve assembly includes a body disk seated within the inner chamber, a control disk seated toward a suction cup end of the bellows, a spring positioned between the body disk and the control disk, and a control stem extending through the central valve aperture of the body disk, through the spring, and secured to the control disk. When the control stem is seated within the central valve aperture, the valve assembly restricts fluid suction to within the inner chamber. When the valve control stem is unseated from the central valve aperture, the valve assembly conveys fluid suction to the suction cup end of the bellows.

Figure 2A:
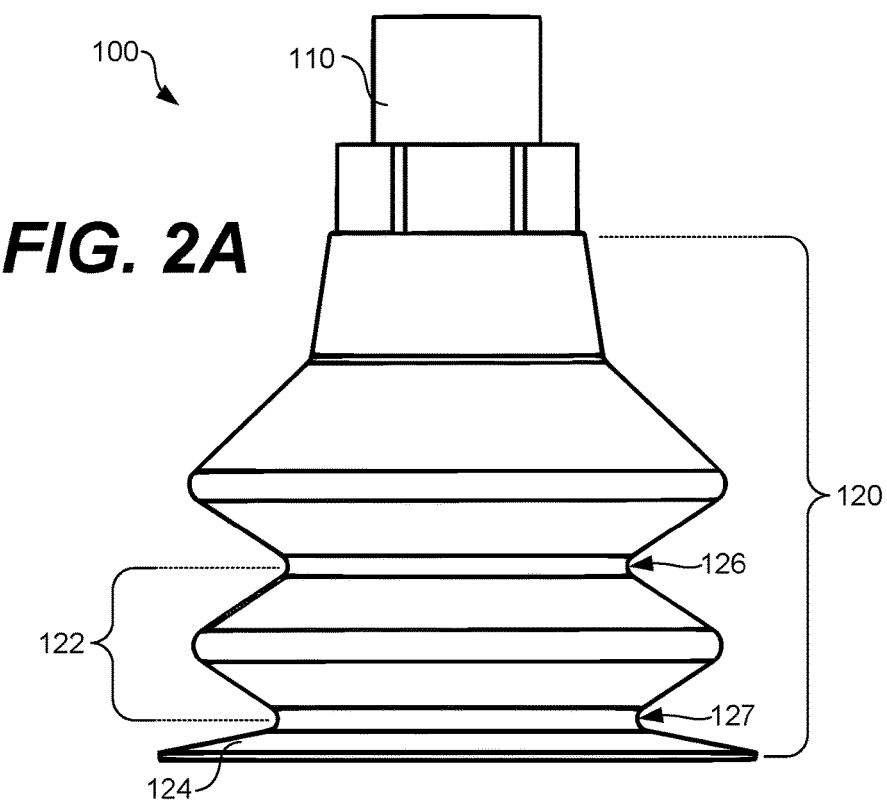
FIG. 2A illustrates a side view of a vacuum cup with an internal valve according to various aspects of the embodiments of the present disclosure.
Figure 2B:
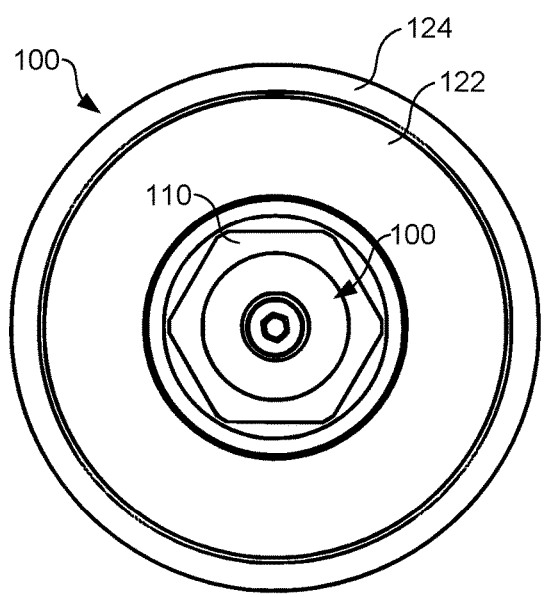
FIG. 2B illustrates a top-down view of the vacuum cup with an internal valve shown in FIG. 2A according to various aspects of the embodiments of the present disclosure.
Figure 2C:
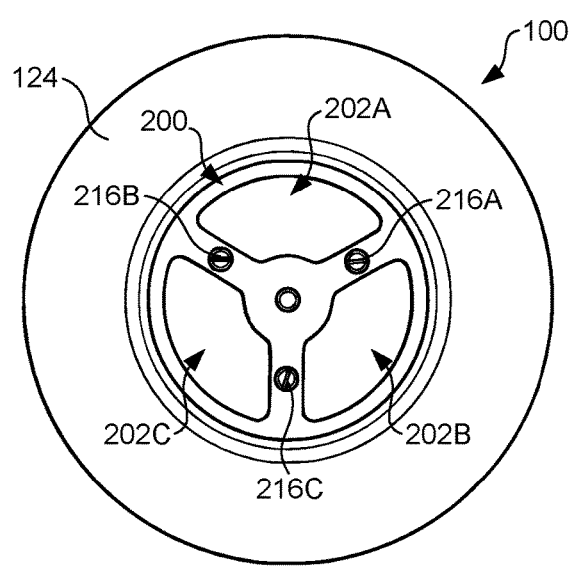
FIG. 2C illustrates a bottom-up view of the vacuum cup with an internal valve shown in FIG. 2A according to various aspects of the embodiments of the present disclosure.
Figure 2D:
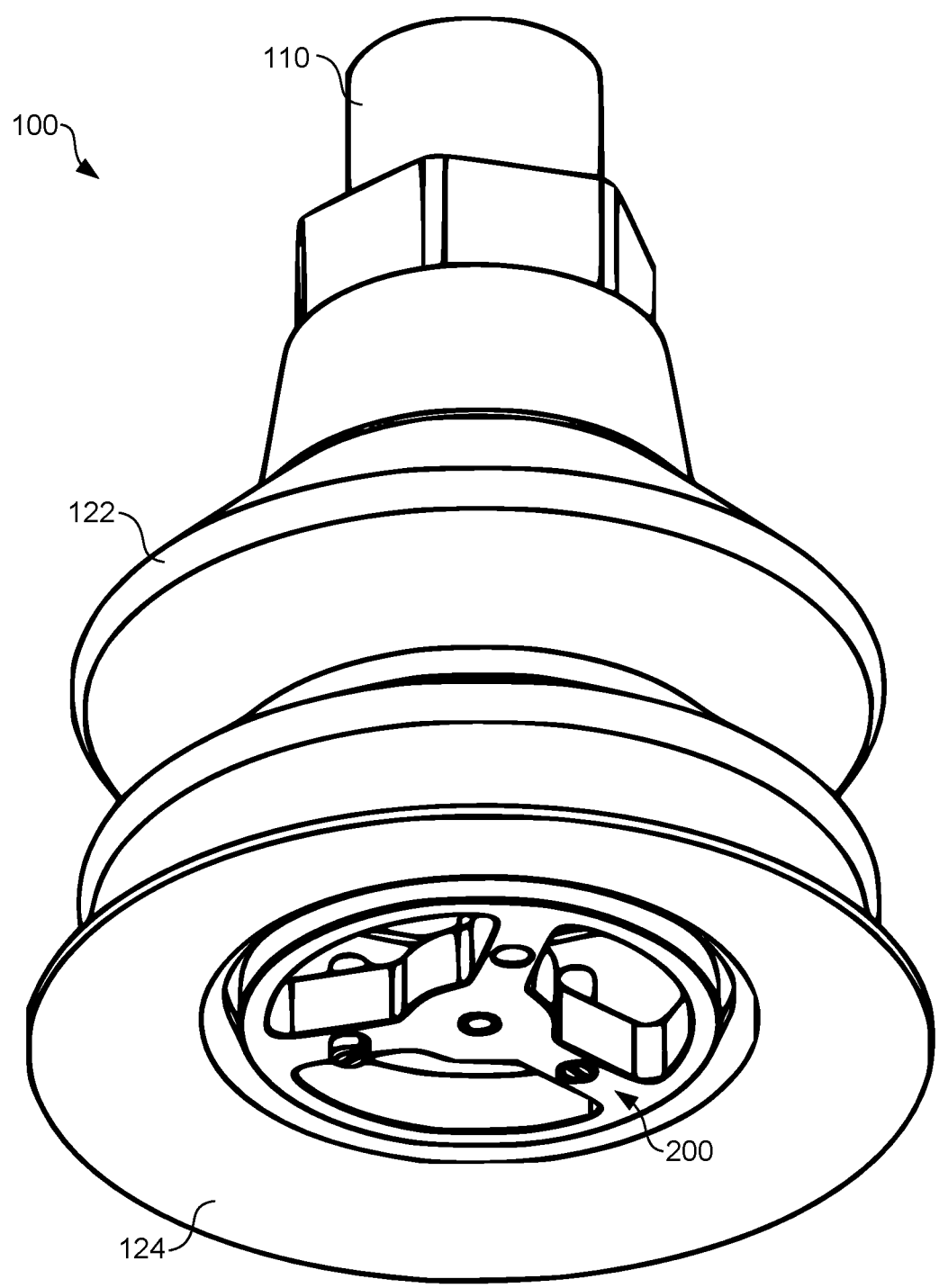
FIG. 2D illustrates a bottom-up, perspective view of the vacuum cup with internal valve shown in FIG. 2A according to various aspects of the embodiments of the present disclosure.
Figure 3:
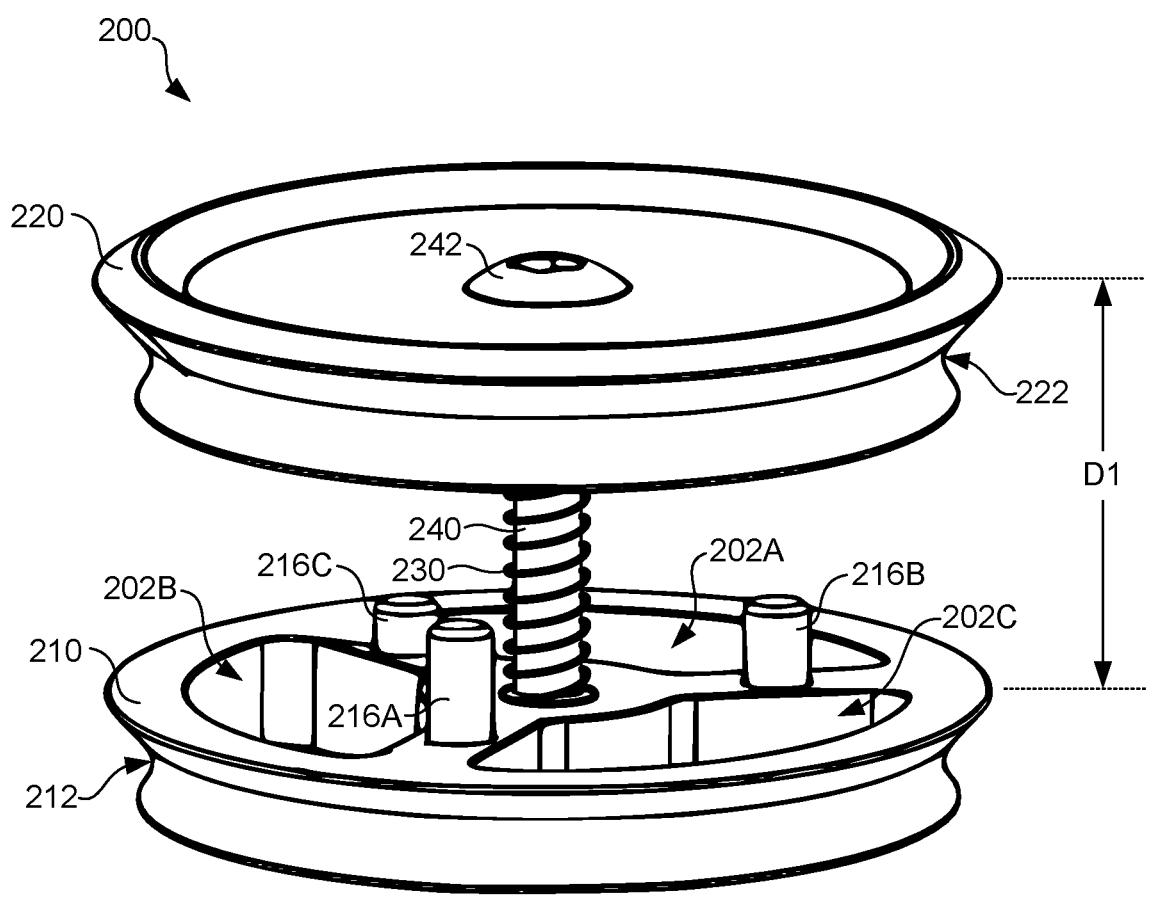
FIG. 3 illustrates the internal valve assembly of the vacuum cup shown in FIGS. 2A-2D according to various aspects of the embodiments of the present disclosure.
Figure 4:
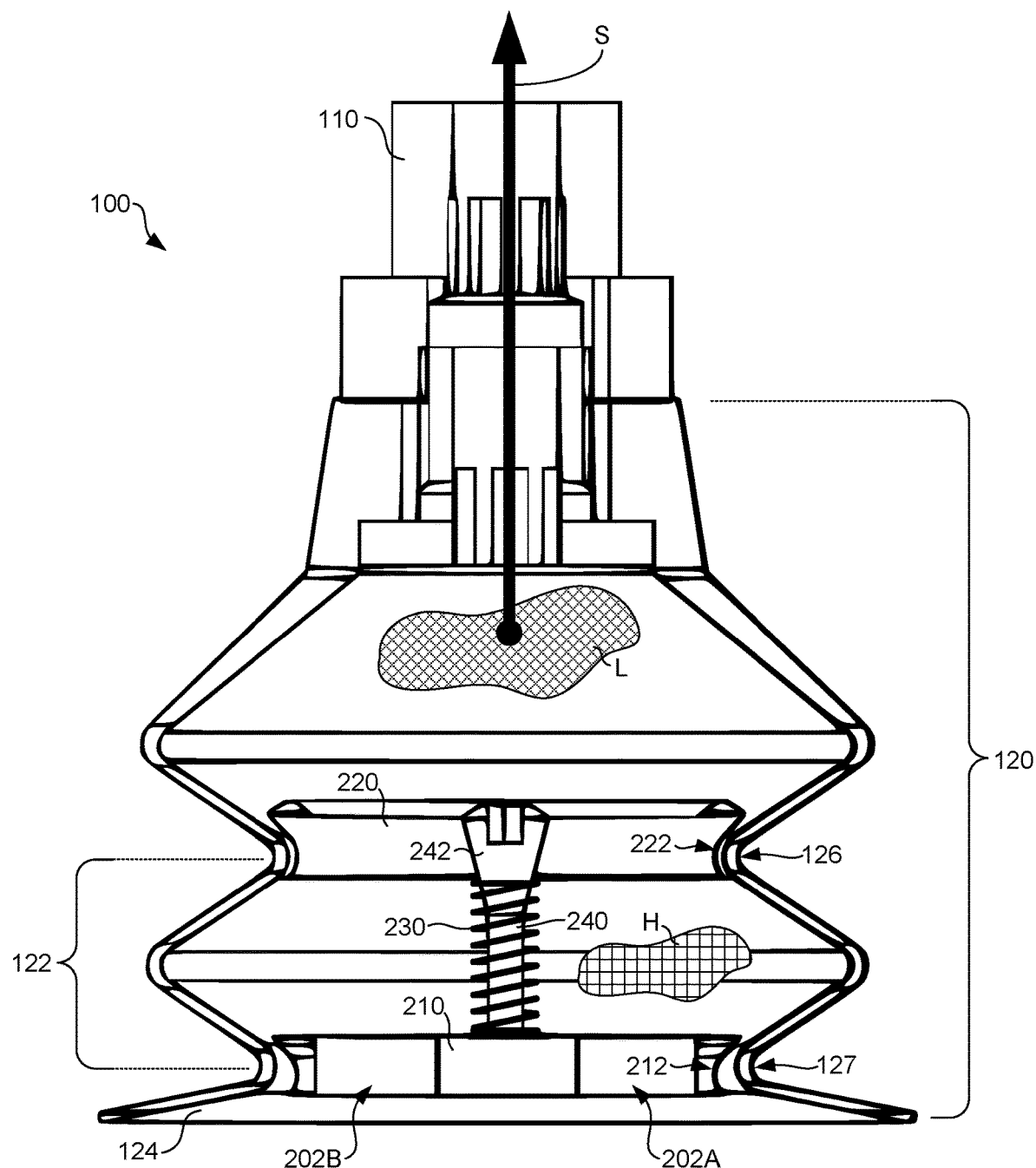
FIG. 4 illustrates a representative, cross-sectional view of the vacuum cup shown in FIGS. 2A-2D according to various aspects of the embodiments of the present disclosure.

Turning to a detailed description of the embodiments, FIG. 2A illustrates a side view of a vacuum cup 100, FIG. 2B illustrates a top-down view of the vacuum cup 100, and FIG. 2C illustrates a bottom-up view of the vacuum cup 100 with an internal valve assembly 200 according to various aspects of the embodiments of the present disclosure. FIG. 2D also illustrates a bottom-up, perspective view of the vacuum cup 100 with the internal valve assembly 200. The vacuum cup 100 shown in FIGS. 2A-2D is representative and provided to convey the structural and functional features and advantages of the embodiments. The vacuum cup 100 is not necessarily drawn to scale, and the concepts described herein are applicable to other styles, shapes, and types of vacuum cups. Similarly, the detailed illustrations of the valve assembly 200, as shown in FIGS. 3 and 4, are representative, not drawn to scale, and are applicable for use with other styles, shapes, and types of vacuum cups.

Referring among FIGS. 2A-2D, the vacuum cup 100 comprises a stem tube 110, a bellows 120 fitted to an end of the stem tube 110, and a valve assembly 200 positioned and seated within the bellows 120. The bellows 120 includes a suction cup 124 at one end and a number of compressible pleated convolutions 122, with pleats 126, 127 separating the pleated convolutions 122. An inner chamber is formed within the bellows 120.

The stem tube 110 can be formed as a hollow tube from metal, plastic, or other suitable material. The bellows 120 can be formed from a suitable type of rubber, plastic, fabric, pulp or paper product, other materials, or any combination thereof, with a degree of flexibility or compliance. Additionally, as described in further detail below, the valve assembly 200 can be formed through additive, subtractive, or other manufacturing techniques from plastic, metal, rigid rubber, other materials, or any combination thereof.

In operation, suction can be provided from a vacuum, through the stem tube 110, and into the inner chamber formed within the bellows 120. As described in further detail below with reference to FIGS. 4 and 6, the valve assembly 200 can maintain a region of low pressure within the inner chamber of the bellows 120 based on the suction when the valve assembly 200 is closed. The valve assembly 200 can remain closed while the bellows 120 is uncompressed as shown in FIGS. 2A-2D. In this closed state, the valve assembly 200 restricts fluid suction to within the inner chamber of the bellows 120, and the suction from the vacuum will not reach the apertures 202A-202C of the valve assembly 200.

Figure 6:
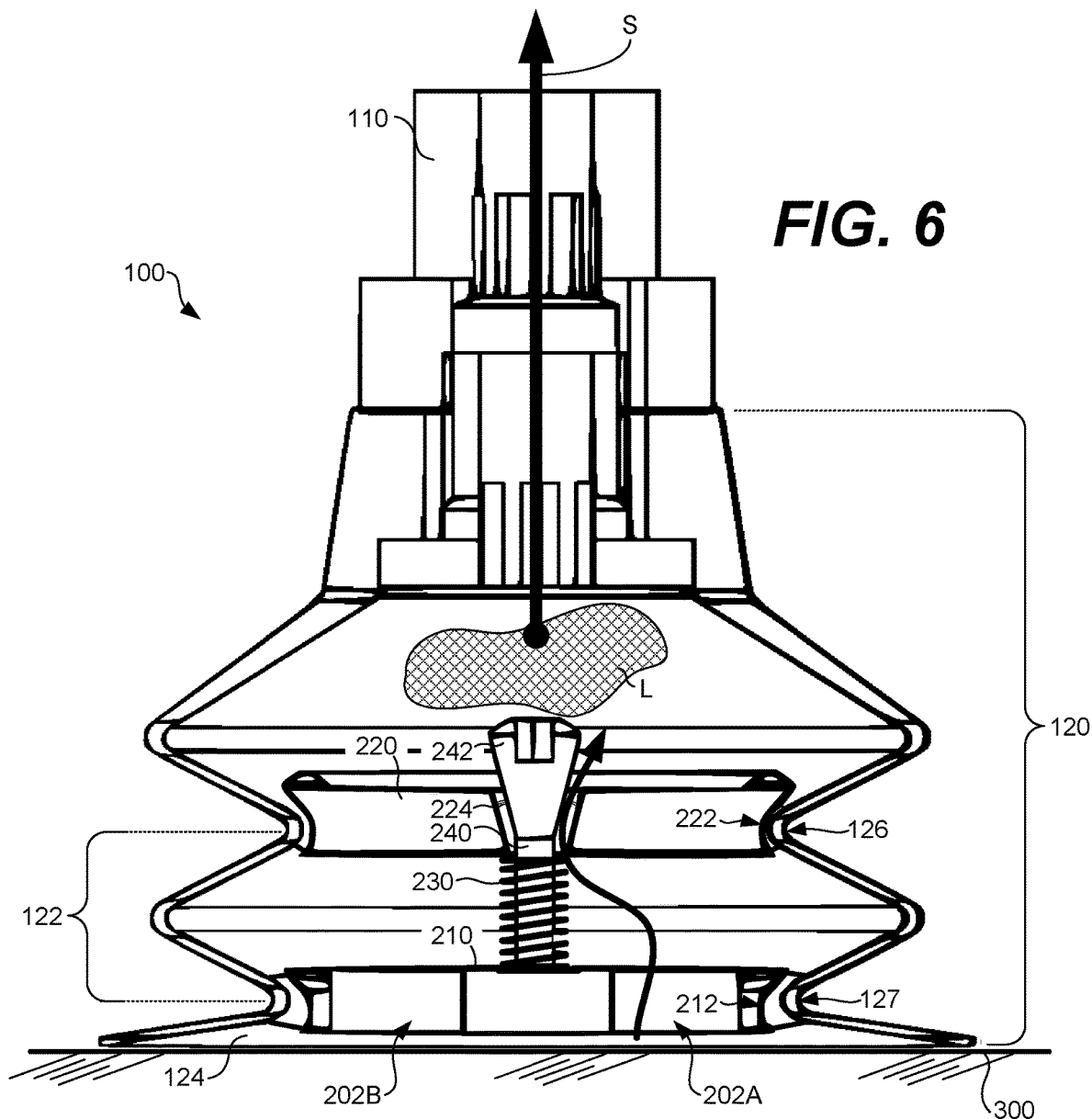
FIG. 6 illustrates a representative, cross-sectional view of the vacuum cup shown in FIGS. 2A-2D, in a compressed state, according to various aspects of the embodiments of the present disclosure.

The valve assembly 200 can also permit the suction from the vacuum to reach the apertures 202A-202C when the valve assembly 200 is open. Based on the design of the valve assembly 200, the valve assembly 200 can open when the bellows 120 is compressed, as shown in FIG. 6 and described in further detail below. Thus, the valve assembly 200 offers a type of stop or check valve and is actuated (e.g., opened and closed) by compression of the bellows 120. If incorporated into the vacuum cups 32 of the vacuum system 10 shown in FIG. 1, the valve assembly 200 can prevent the loss of suction (and the related inefficiencies) through the vacuum cups 32 that do not contact and are not compressed against any the boxes 40. At the same time, the valve assembly 200 permits suction to flow through the vacuum cups 32 that come into contact with and are compressed against the boxes 40. Effectively, the valve assembly 200 can be relied upon as a suction valve or "switch" in each of the vacuum cups 32, to avoid the loss of suction where unnecessary.

FIG. 3 illustrates the valve assembly 200 of the vacuum cup 100 shown in FIGS. 2A-2D according to various aspects of the embodiments of the present disclosure. The valve assembly 200 is shown in the closed position in FIG. 3. The valve assembly 200 includes a valve control disk 210, a valve body disk 220, a valve spring 230, and a valve control stem 240. The valve assembly 200 shown in FIG. 3 also includes a number of control disk backstops 216A-216C, although the control disk backstops 216A-216C can be omitted in some cases. The valve assembly 200 is not drawn to any particular scale in FIG. 2, and the components of the valve assembly 200 can vary in size and shape as compared to that shown. In general, the valve assembly 200 can be designed and sized to fit snugly among the pleats 126, 127 of the bellows 120 as illustrated in FIG. 4 and described below.

The valve control disk 210, valve body disk 220, and valve control stem 240 can be formed through additive, subtractive, or other manufacturing techniques from plastic, metal, rigid rubber, other materials, or any combination thereof. The valve spring 230 can be formed from carbon, alloy steel, stainless steel, or other suitable materials, and the valve spring 230 can be any suitable size in various embodiments.

Figure 5:
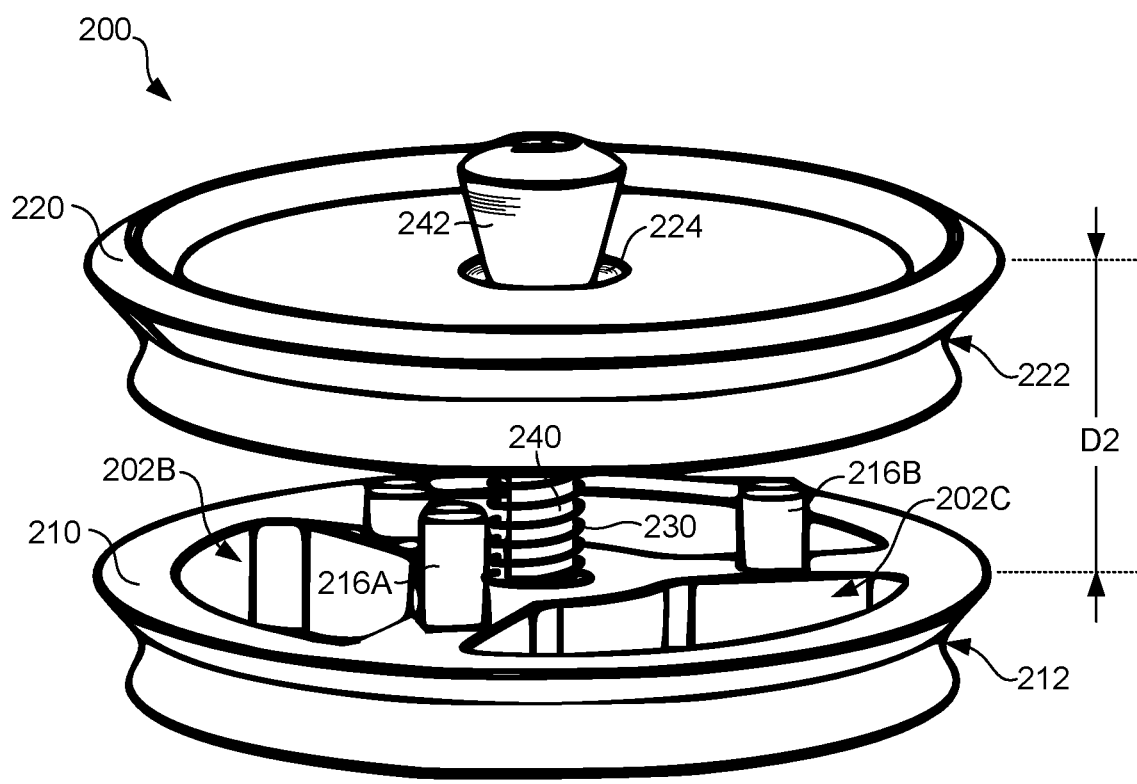
FIG. 5 illustrates the internal valve assembly of the vacuum cup shown in FIGS. 2A-2D, in a compressed state, according to various aspects of the embodiments of the present disclosure.

The valve control disk 210 includes the apertures 202A-202C to convey the suction of fluid, namely air in typical operation, when the valve assembly 200 is open, as shown in FIG. 5 and described in further detail below. The valve control stem 240 extends through a central valve aperture of the valve body disk 220, through the valve spring 230, and is secured at a first distal end to the valve control disk 210 at a proximate center of the valve control disk 210. The valve control stem 240 also includes a tapered valve stop 242 at a second distal end.

Although not visible in FIG. 3 (but shown in FIGS. 5 and 6), the central valve aperture of the valve body disk 220 is tapered. The tapered valve stop 242 seats into the central valve aperture when the valve assembly 200 is closed. The tapered valve stop 242 seals the central valve aperture of the valve body disk 220 to prevent the communication of fluid (e.g., air) through the central valve aperture in this closed position. When the bellows 120 is not compressed, the spring constant of the valve spring 230 is sufficiently large enough to maintain the valve control disk 210 and the valve body disk 220 separated apart from each other, at the distance "D1," as shown in FIG. 3. In this configuration, the tapered valve stop 242 is seated into the central valve aperture of the valve body disk 220, sealing the central valve aperture of the valve body disk 220.

The valve control disk 210 is round in shape and includes a semicircular ridge 212 about its periphery. Similarly, the valve body disk 220 is round in shape and includes a semicircular ridge 222 about its periphery. As shown in FIG. 4, when the valve assembly 200 is positioned and seated within the bellows 120 of the vacuum cup 100, the semicircular ridge 212 of the valve control disk 210 is seated at the pleat 127 between the suction cup 124 and one of the compressible pleated convolutions 122 of the bellows 120. Further, the semicircular ridge 222 of the valve body disk 220 is seated at the pleat 126 within the inner chamber of the bellows 120. In other embodiments, the valve control disk 210 and the valve body disk 220 can be formed to other sizes and shapes, such as oval, square, rectangular, or other shapes, depending upon the size, shape, and style of the bellows for use with.

As shown in FIG. 3, each of the control disk backstops 216A-216C extends a certain distance from an upper surface of the valve control disk 210. In one example, each of the control disk backstops 216A-216C is formed as a threaded post. The valve control disk 210 also includes one threaded eyelet for each of the control disk backstops 216A-216C. The threaded eyelets extend through the valve control disk 210. At one end, each of the control disk backstops 216A-216C can include a crosshead (e.g., Phillips), flathead, hexagonal (e.g., Allen), or other suitable style of socket. FIG. 2C illustrates flathead sockets of the control disk backstops 216A-216C, as one example, and the control disk backstops 216A-216C can be screwed or twisted into the threaded eyelets of the valve control disk 210 using the flathead sockets to secure them into place.

Depending on the extent to which the control disk backstops 216A-216C are screwed or twisted into the threaded eyelets of the valve control disk 210, a certain length of the control disk backstops 216A-216C can extend out from the valve control disk 210, between the valve control disk 210 and valve body disk 220. The length of this extension can be adjusted individually for each of the control disk backstops 216A-216C. As shown in FIG. 3, the control disk backstop 216A extends the furthest out from the valve control disk 210, the control disk backstop 216B extends a shorter distance than the control disk backstop 216A, and the control disk backstop 216C extends the least or shortest out from the valve control disk 210.

As described in further detail below with reference to FIGS. 7A and 7B, the control disk backstops 216A-216C can be relied upon in the valve assembly 200 to maintain a predefined, minimal mechanical interference distance between the valve body disk 220 and the valve control disk 210 during compression of the bellows 120. Particularly, as the bellows 120 is compressed, the valve body disk 220 and the valve control disk 210 will be pushed or pressed toward each other against the bias provided by the valve spring 230. If the valve body disk 220 and the valve control disk 210 are pressed towards each other to a sufficient extent, the valve control disk 210 will eventually contact the ends of the control disk backstops 216A-216C, preventing the valve control disk 210 from contacting and pressing up against the valve body disk 220. Thus, the control disk backstops 216A-216C are relied upon in the valve assembly 200 to maintain a clearance for the apertures 202A-202C of the valve control disk 210.

The control disk backstops 216A-216C can also be relied upon to maintain a predefined mechanical interference, at a predefined angular orientation, between the valve body disk 220 and the valve control disk 210 when the bellows 120 is compressed. The angular orientation can be predefined by establishing different lengths of extension of the control disk backstops 216A-216C, respectively, beyond the valve control disk 210. By setting a mechanical interference at a predefined angular orientation between the valve body disk 220 and the valve control disk 210, the valve assembly 200 can be used to help conform the suction cup 124 of the bellows 120 for suction against curved or angled surfaces as described in further detail below with reference to FIGS. 7A and 7B.

FIG. 4 illustrates a representative, cross-sectional view of the vacuum cup 100 shown in FIGS. 2A-2D. In FIG. 4, the parts of the valve assembly 200 shown in FIG. 3 are illustrated within the bellows 120 of the vacuum cup 100. Particularly, the semicircular ridge 212 of the valve control disk 210 is seated at the pleat 127 between the suction cup 124 and one of the compressible pleated convolutions 122 of the bellows 120. Further, the semicircular ridge 222 of the valve body disk 220 is seated at the pleat 126 within the inner chamber of the bellows 120. The bellows 120 is shown in an uncompressed or nominal shape in FIG. 4.

As shown, the valve control stem 240 extends through a central valve aperture of the valve body disk 220, through the valve spring 230, and is secured at a first distal end to the valve control disk 210 at a proximate center of the valve control disk 210. The valve control stem 240 also includes a tapered valve stop 242 at a second distal end. The tapered valve stop 242 of the valve control stem 240 is seated into the central valve aperture of the valve body disk 220. The tapered valve stop 242 seals the central valve aperture of the valve body disk 220 to prevent the communication of fluid (e.g., air) through the central valve aperture, and the valve assembly 200 is closed in this configuration. When the bellows 120 is not compressed, the spring constant of the valve spring 230 is sufficiently large enough to maintain the valve control disk 210 and the valve body disk 220 apart from each other as shown in FIG. 4, with the tapered valve stop 242 seated into the central valve aperture of the valve body disk 220.

Through the stem tube 110, suction "S" from a vacuum can create a region of low pressure "L" within the inner chamber of the bellows 120, shown above the valve body disk 220 in FIG. 4. The valve assembly 200 restricts the region of low pressure "L" to the area above the valve body disk 220 within the inner chamber of the bellows 120 in the closed configuration shown. A region of relatively high pressure "H" remains below the valve body disk 220, and the valve body disk 220 blocks the suction of fluid in the closed configuration. Thus, the suction "S" cannot draw fluid through the apertures 202A-202C in the valve control disk 210.

FIG. 5 illustrates the valve assembly 200 of the vacuum cup 100 shown in FIGS. 2A-2D in a compressed state. The valve assembly 200 is open in the configuration shown in FIG. 3. As compared to FIG. 3, the valve control disk 210 and the valve body disk 220 have been pressed closer to each other in FIG. 5, against the spring constant of the valve spring 230. Thus, the distance "D2" in FIG. 5 is shorter than the distance "D1" in FIG. 3. The valve control disk 210 and the valve body disk 220 can be moved or pressed together when the compressible pleated convolutions 122 of the bellows 120 are pressed together. For example, when the bellows 120 is compressed, the valve control disk 210 and the valve body disk 220 move or press together along with the pleats 126, 127.

As described above, the valve control stem 240 extends through the central valve aperture 224 of the valve body disk 220, through the valve spring 230, and is secured to the valve control disk 210 at a first distal end. The tapered valve stop 242 at the second distal end of the valve control stem 240 can seat into and seal the central valve aperture 224, but is not mechanically secured into the central valve aperture 224. The valve control stem 240 is also rigid and does not bend or compress under typical operating forces. Thus, when the valve control disk 210 and the valve body disk 220 have been pressed together as shown in FIG. 5, the tapered valve stop 242 of the valve control stem 240 becomes unseated from the central valve aperture 224, and the valve assembly 200 opens. As described in greater detail below with reference to FIG. 6, the valve assembly 200 permits the communication of fluid (e.g., air) through the central valve aperture 224 when the valve assembly 200 is open.

Although the valve control disk 210 and the valve body disk 220 have been pressed closer to each other in FIG. 5, the valve body disk 220 still does not contact the control disk backstops 216A-216C. If the valve control disk 210 and the valve body disk 220 are pressed even closer together, the valve control disk 210 can ultimately contact the control disk backstops 216A-216C, preventing the valve control disk 210 and the valve body disk 220 from being pressed against each other.

FIG. 6 illustrates a representative, cross-sectional view of the vacuum cup 100 shown in FIGS. 2A-2D, in a compressed state. Similar to FIG. 4, the parts of the valve assembly 200 are illustrated within the bellows 120 of the vacuum cup 100 in FIG. 5. Again, the semicircular ridge 212 of the valve control disk 210 is seated at the pleat 127, and the semicircular ridge 222 of the valve body disk 220 is seated at the pleat 126 within the inner chamber of the bellows 120. The bellows 120 is shown in a compressed shape in FIG. 6, as it has been pressed against the item 300, and the pleated convolutions 122 of the bellows 120 are pressed or compressed together as compared to FIG. 4.

As shown, the valve control stem 240 extends through a central valve aperture of the valve body disk 220, through the valve spring 230, and is secured to the valve control disk 210. The valve control stem 240 also includes the tapered valve stop 242 at the second distal end. The tapered valve stop 242 is unseated from the central valve aperture 224 of the valve body disk 220, permitting the communication of fluid (e.g., air) through the central valve aperture 224, and the valve assembly 200 is open in this configuration.

Through the stem tube 110, suction "S" from a vacuum can create a region of low pressure "L" within the inner chamber of the bellows 120. With the tapered valve stop 242 unseated from the central valve aperture 224, the suction "S" can also draw fluid through the central valve aperture 224 and the apertures 202A-202C in the valve control disk 210. With the suction "S" passing to the apertures 202A-202C, the suction cup 124 can adhere to and grip the item 300. The vacuum cup 100 can then be lifted by the stem tube 110 to lift and reposition the item 300. Notably, the region of low pressure "L" is maintained within the inner chamber of the bellows 120 until the bellows 120 is compressed against the item 300 and the tapered valve stop 242 is unseated from the central valve aperture 224. Thus, the suction of the vacuum is applied in a more efficient and effect manner than if the valve assembly 200 were not present within the bellows 120.

Figure 7:
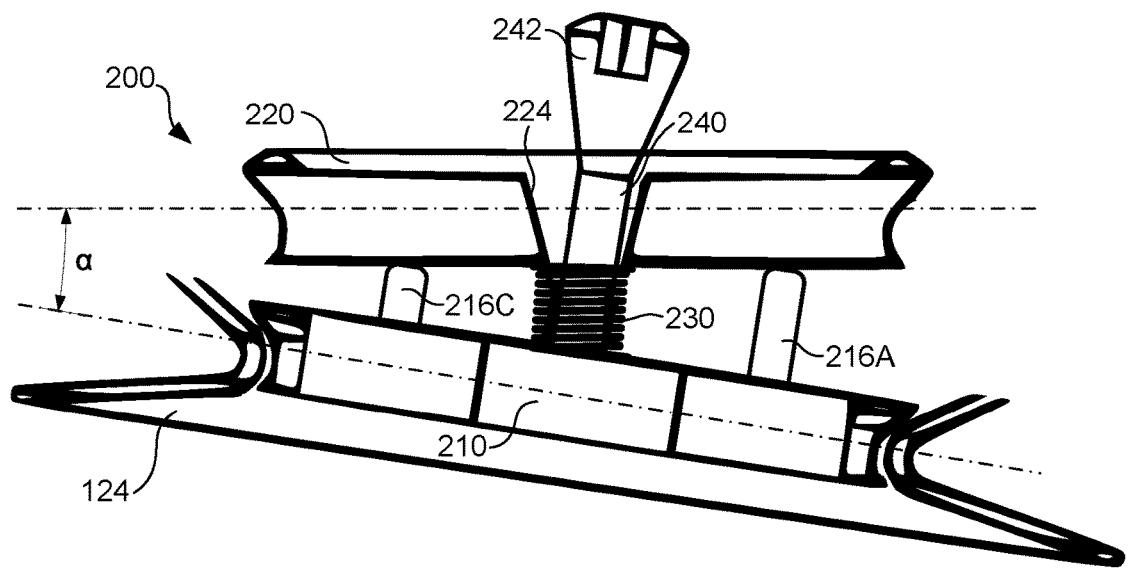
FIG. 7 illustrates the internal valve assembly of the vacuum cup shown in FIGS. 2A-2D, in a compressed state at a predefined angular orientation, according to various aspects of the embodiments of the present disclosure.

The control disk backstops 216A-216C are omitted from view in both FIGS. 4 and 6, but the purpose for the control disk backstops 216A-216C is further described with reference to FIG. 7. As shown in FIG. 7, the control disk backstops 216A-216C can be relied upon to maintain a minimum, predefined mechanical interference between the valve body disk 220 and the valve control disk 210 at a predefined angular orientation "a" when the bellows 120 is compressed. The effect is to pitch or angle the suction cup 124 when the bellows 120 is compressed and the valve assembly 200 is open to convey suction as shown in FIG. 7.

The angular orientation "a" can be predefined by selecting different lengths for the control disk backstops 216A-216C, respectively. As shown in FIG. 7, for example, the control disk backstop 216A extends further beyond the top surface of the valve control disk 210 than the control disk backstop 216C. Although not shown in FIG. 7, the control disk backstop 216B can also be set to extend a predetermined length beyond the top surface of the valve control disk 210.

When the valve body disk 220 and the valve control disk 210 are pressed together, the valve body disk 220 will eventually contact the ends of the control disk backstops 216A-216C, with the angle "a" between them. The valve body disk 220 and the valve control disk 210 cannot be pressed further together because of the mechanical interference provided by the control disk backstops 216A-216C. The lengths of the control disk backstops 216A-216C can be adjusted, respectively, by screwing or twisting the sockets of the control disk backstops 216A-216C, which are visible in FIG. 2C. Through this adjustment, any suitable angular orientation can be established between the valve body disk 220 and the valve control disk 210 when the bellows 120 is compressed.

Referring to FIG. 7, it is clear how the valve body disk 220 and the valve control disk 210 can move at various angles with respect to each other, at least to some extent, when the bellows 120 is compressed. In other words, the valve assembly 200 is designed to permit relative (and angular) movement between the valve body disk 220 and the valve control disk 210 when the bellows 120 is compressed. Further, when the bellows 120 returns to an uncompressed state, the valve assembly 200 is designed to return to the orientation shown in FIGS. 3 and 4. Particularly, the tapered valve stop 242 is conic in shape and form, and the central valve aperture 224 of the valve body disk 220 is formed with a complimentary, conic shape. Thus, when the bellows 120 returns to the uncompressed state, the valve spring 230 pushes the tapered valve stop 242 back into the central valve aperture 224. When the tapered valve stop 242 is seated in the central valve aperture 224, the valve control stem 240 extends perpendicular to the valve body disk 220 and the valve control disk 210.

In some cases, the inner surfaces of the central valve aperture 224, the outer surfaces of the tapered valve stop 242, or both, can be lined or coated with a type of gasket material, such as paper, rubber, silicone, cork, polytetrafluoroethylene (PTFE or TEFLON®), other plastic polymer, or other suitable material to offer a good seal between them when seated together, although it is not necessary for many applications. In other variations, the tapered valve stop 242 can be formed in other shapes, such as conic oval, conic triangular (e.g., three- or four-sided pyramidal), tapered plus (e.g., "+"), or other tapered shapes. These shapes may be relied upon, for example, to prevent the valve body disk 220 and the valve control disk 210 from rotating with respect to each other during and after compressions of the bellows 120.

Figure 8:
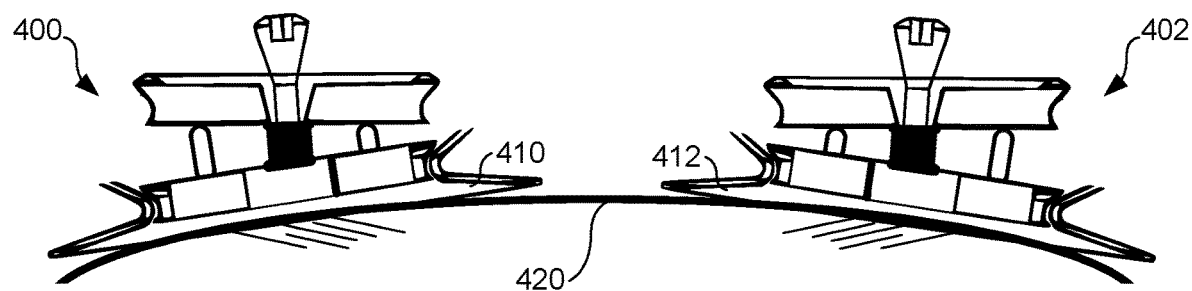
FIG. 8 illustrates a representative example of two vacuum cups according to the embodiments, with different predefined angular orientations set for vacuum cups to grip a curved item.

According to the concepts introduced in FIG. 7, the valve assembly 200 can be used to configure vacuum cup for suction against curved or angled surfaces. As one example, FIG. 8 illustrates a representative example of two vacuum cups 400, 402 with valve assemblies set for different angular orientations to grip a curved (e.g., non-flat) item 420. As shown, the valve assembly in the vacuum cup 400 is configured to orient the suction cup 410 at a first angle when compressed, and the valve assembly in the vacuum cup 402 is configured to orient the suction cup 412 at a second angle when compressed, where the first and second angles are different. The vacuum cups 400, 402 can provide better adhesion to the item 420 as configured, for better adhesion to the curved or angled surfaces of the item 420. Although the example shown in FIG. 8 illustrates two vacuum cups 400, 402, any number of vacuum cups can be arranged in a grid and configured, respectively, to conform to irregular or undulating surfaces. Additionally, vacuum cups including valve assemblies according to the concepts described herein can be arranged on various types of panels, including panels with multiple flat surfaces arranged at various orientations, curved surfaces, and combinations thereof.

Figure 9:
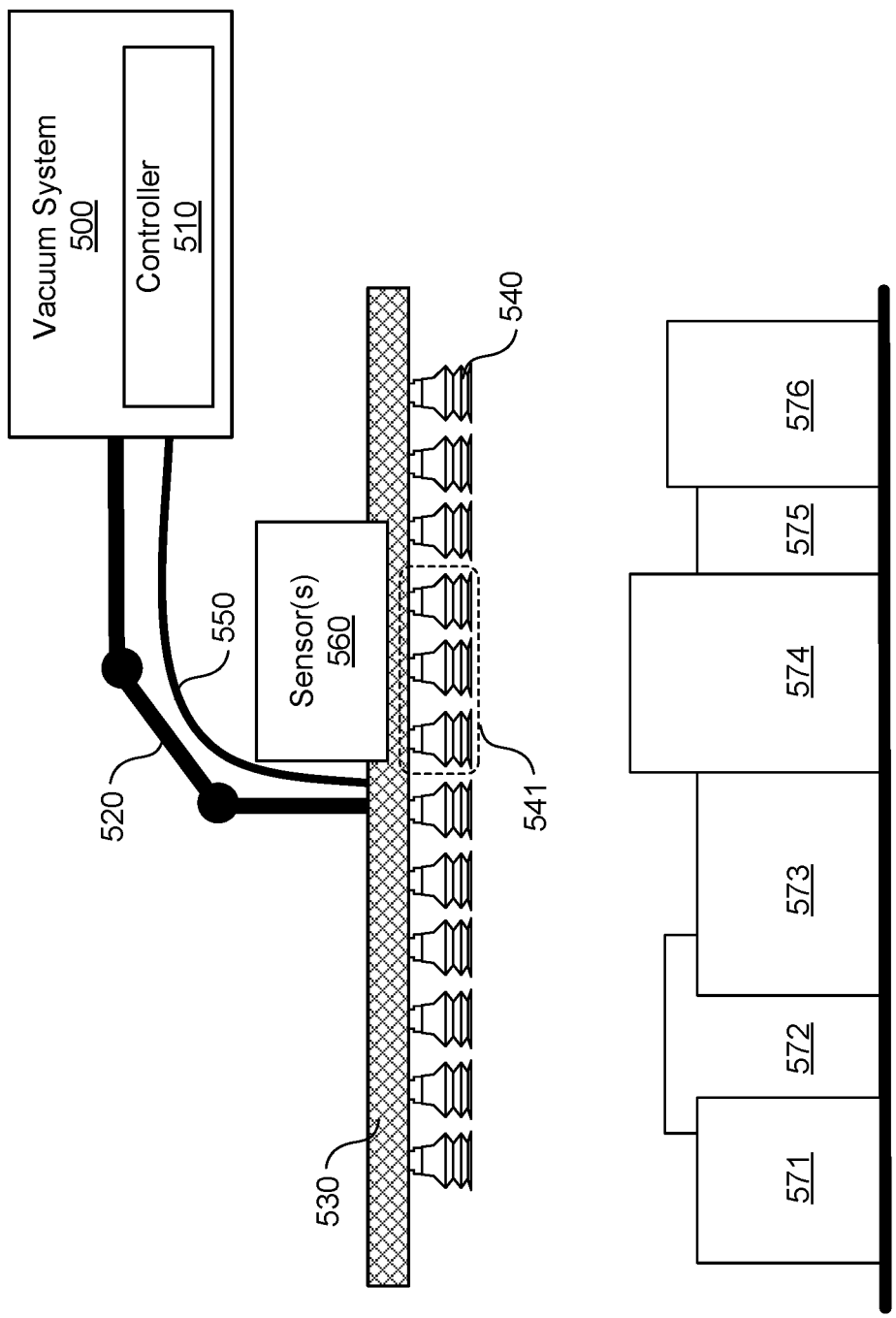
FIG. 9 illustrates a vacuum system implementing pick strategies according to various aspects of the embodiments of the present disclosure.

FIG. 9 illustrates a vacuum system 500 implementing pick strategies according to various aspects of the embodiments of the present disclosure. The vacuum system 500 is representative and illustrated to convey certain advantages that can be achieved when using the valve assemblies described herein. Among other components, the vacuum system 500 includes a controller 510, a robotic arm 520, a panel 530 affixed to one end of the robotic arm 520, a number of vacuum cups 540 provided in a distributed arrangement on the panel 530, a vacuum tube 550 to provide suction to the panel 530 and the vacuum cups 540, and one or more sensors 560. The panel 530 and vacuum cups 540 form a type of end of arm tool of the robotic arm 520. Each of the vacuum cups 540 incorporates a valve assembly similar to the valve assembly 200 described above. FIG. 9 also illustrates various items 571-576 to pick using the vacuum system 500.

The controller 510 can be embodied as an embedded control system for the vacuum system 500, including one or more processors and memories, implemented using a combination of hardware and software, for example. The controller 510 is configured to direct the overall operation of the vacuum system 500 to pick and reposition one or more of the items 571-576. In that sense, the controller 510 is configured to direct the movement of the robotic arm 520, the panel 530, and the vacuum cups 540, to contact one or more of the items 571-576 with the vacuum cups 540. The controller 510 is also configured to control the operation of a vacuum of the vacuum system 500. The controller 510 can turn the vacuum on at a certain time, for example, to grip one or more of the items 571-576. The controller 510 is also configured to move and reposition the robotic arm 520 and, when appropriate, turn the vacuum off to drop the items 571-576 at a new location.

During operation, the controller 510 can also monitor one or more reference signals (e.g., analog or digital signals for processing by the controller 510) provided by the sensors 560, where the reference signals provide an indication of contact (or near contact) between the vacuum cups 540 and one or more of the items 571-576. The controller 510 can refer to the reference feedback from the sensors 560 to determine whether or not the vacuum cups 540 have contacted and/or gripped one or more of the items 571-576, as described below.

In various implementations, the sensors 560 can be embodied as one or more pressure sensors, proximity sensors, contact sensors, other sensors, or a combination thereof, capable of providing one or more signals indicative of contact between one or more of the vacuum cups 540 and one or more of the items 571-576. As one example, the sensors 560 can be embodied as transducers that convert a measure of fluid pressure (and/or suction) to an electrical signal for measurement by the controller 510. In this case, the sensors 560 in FIG. 9 can be representative of one or more pressure sensors installed within the panel 530 to measure an aggregate pressure distributed among the vacuum cups 540. Additionally or alternatively, the sensors 560 can be embodied as a number of individual pressure sensors installed, respectively, in each of the vacuum cups 540. In other examples, the sensors 560 can be embodied as contact or interference sensors that convert a measure of contact (or near contact) to an electrical signal for measurement by the controller 510. In any case, based on the signals provided by the sensors 506, the controller 510 can determine whether or not individual vacuum cups 540 are approaching or have contacted individual ones of the items 571-576. The controller 510 can also determine the size and/or shape of the items 571-576 based on the signals provided by the sensors 506.

Each of the vacuum cups 540 incorporates a valve assembly similar to the valve assembly 200 described herein. Thus, before the vacuum cups 540 contact any of the items 571-576 as shown in FIG. 9, the valve assemblies in the vacuum cups 540 are closed. In this case, when the controller 510 turns the suction of the vacuum system 500 on, the suction will tend to evacuate the fluid (e.g., air) within the panel 530 and the inner chambers of the vacuum cups 540, to form a region of low pressure, but the suction will not draw additional air through the vacuum cups 540. At the same time, the controller 510 can monitor the sensors 560 to detect when the region of low pressure within the panel 530 and/or the inner chambers of the vacuum cups 540 has reached a low pressure equilibrium state.

In one aspect of the embodiments, the use of the valve assemblies in the vacuum cups 540 allows the vacuum system 500 to more effectively or efficiently pick certain ones of the items 571-576. For example, when the controller turns the vacuum of the vacuum system 500 on, the low pressure equilibrium is established in the vacuum cups 540 without loss of suction through any of the vacuum cups 540. The controller 510 can then move the robotic arm 520 down toward the items 571-576. Suction is engaged or "opened" after contact between one or more of the items 571-576 and one or more of the vacuum cups 540 as described herein. In the example shown in FIG. 9, the group of vacuum cups 541 will first contact the item 574, due to the relatively larger (i.e., taller) size of the item 574.

In a conventional vacuum system without valves in the vacuum cups 540, all the vacuum cups 540 would be open and pass the suction from the vacuum system 500, regardless of any contact with the items 571-576. Thus, in such a conventional vacuum system, the group of vacuum cups 541 might not sufficiently adhere to the item 574, because suction would be redistributed, at least in part, to the remaining open vacuum cups 540 upon contact between the group of vacuum cups 541 and the item 574.

In the example shown in FIG. 9, however, the group of vacuum cups 541 will first contact the item 574, due to the relatively larger (i.e., taller) size of the item 574. When the group of vacuum cups 541 contact the item 574, the valve assemblies within the vacuum cups 541 will open according to the concepts described herein, and suction from the vacuum system 500 will cause the group of vacuum cups 541 to adhere to the item 574. At the same time, the remaining vacuum cups 540 will remain closed, preventing any unnecessary loss or waste of suction. Thus, the use of the valve assemblies in the vacuum system 500 can be relied upon to more effectively or efficiently pick and move the item 574, among other ones of the items 571-576.

In other aspects of the embodiments, the controller 510 can also be configured to monitor the signal from the sensors 560 as the group of vacuum cups 541 contact the item 574. The controller 510 can identify a limited loss of suction (i.e., loss of the low pressure equilibrium) according to signals from the sensors 560, for a limited period of time, when the group of vacuum cups 541 contact the item 574 and the valve assemblies in the group of vacuum cups 541 open. The controller 510 can thus be configured to identify when the item 574 is gripped and ready for repositioning using the robotic arm 520 based on the signals from the sensors 560. Pressure sensors in conventional vacuum systems, on the other hand, cannot be used to identify when the group of vacuum cups 541 contact the item 574.

Figure 10:
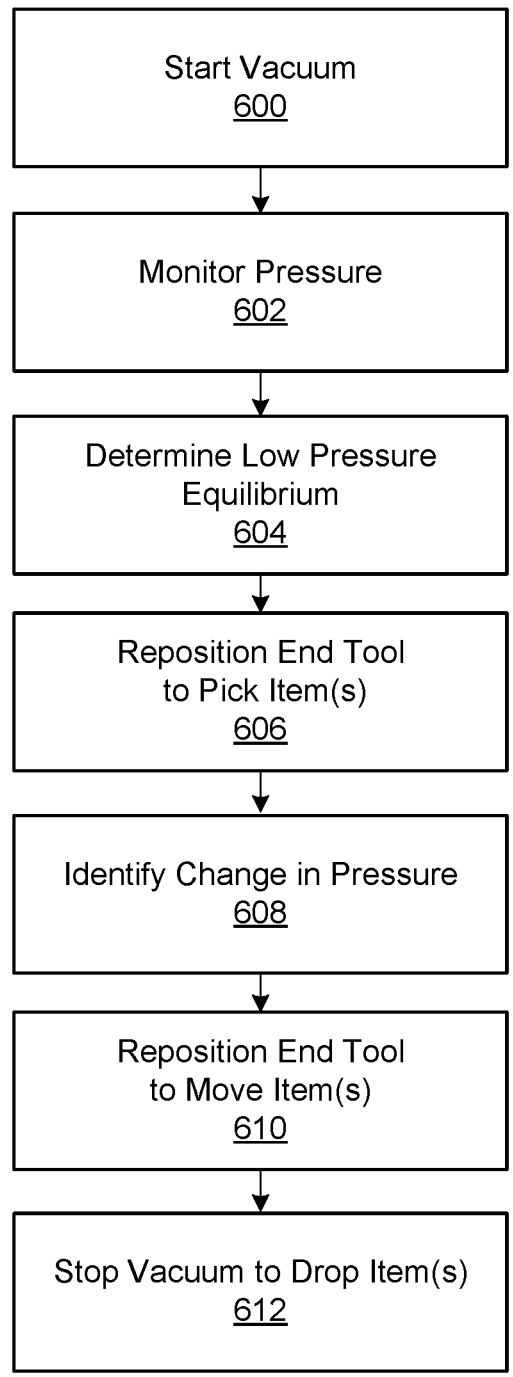
FIG. 10 illustrates an example method of detecting adhesion using a vacuum system according to various aspects of the embodiments of the present disclosure.

FIG. 10 illustrates an example method of detecting adhesion to an item using a vacuum system with a valve assembly according to various aspects of the embodiments of the present disclosure. The process shown in FIG. 10 is described in connection with picking and moving any of the items 571-576 using the vacuum system 500 shown in FIG. 9, although other vacuum systems can perform the process with other items. Although the process diagram shows an order of operation, the order can differ from that which is shown. For example, the order of two or more steps can be switched relative to the order shown or as described below. Also, two or more steps shown in succession can be executed concurrently or with partial concurrence. Further, in some examples, one or more of the steps can be skipped or omitted, and the process can continue on with additional steps for any period of time.

At step 600, the process can include the controller 510 starting a vacuum of the vacuum system 500. Suction from the vacuum can be provided through the vacuum tube 550 to an end tool of the vacuum system 500, such as to the panel 530 and the vacuum cups 540. At step 602, the process can include the controller 510 monitoring pressure at one or more locations in the panel 530 and/or the vacuum cups 540, based on a signal from the sensors 560. In one example, the sensors 560 can be embodied as pressure sensors, and the controller 510 can monitor one or more reference signals provided from the sensors 560 to identify of an amount of pressure (or lack of pressure) at certain locations in the panel 530 and/or the vacuum cups 540. Additionally or alternatively, the controller 510 can monitor the reference signals provided from the sensors 560 to more identify contact between the vacuum cups 540 and one or more of the items 571-576.

At step 604, the process can include the controller 510 determining that the pressure in the end tool of the vacuum system 500 has reached an equilibrium low pressure state. Particularly, each of the vacuum cups 540 incorporates a valve assembly similar to the valve assembly 200 described herein. Thus, before the vacuum cups 540 contact any of the items 571-576 shown in FIG. 9, the valve assemblies in the vacuum cups 540 are closed. In this case, when the controller 510 turns the suction of the vacuum system 500 on at step 600, the suction will tend to evacuate the fluid (e.g., air) within the panel 530 and the inner chambers of the vacuum cups 540, to form a region of low pressure. At the same time, the controller 510 can detect or determine when the region of low pressure within the panel 530 and/or the inner chambers of the vacuum cups 540 has reached a low pressure equilibrium state at step 604.

At step 606, the process can include the controller 510 repositioning the end tool of the vacuum system to pick (or attempt to pick) one of the items 571-576. Here, the controller 510 can control the robotic arm 520 to move the panel 530 and the vacuum cups 540 into proximity with the items 571-576, to ultimately contact and adhere to one or more of the items 571-576.

At step 608, the process can include the controller 510 identifying a change in pressure from the equilibrium low pressure state based on feedback from the sensors 560. The change in pressure can be due to the valve assemblies in the group of vacuum cups 541 opening when contacting the item 574, for example, as described herein. When the valve assemblies in the group of vacuum cups 541 open, suction passes through the vacuum cups 541 to adhere the item 574 to the vacuum cups 541, and this can cause a change in the pressure from the equilibrium low pressure state for a relatively short period of time, as measured by the sensors 560. After the vacuum cups 541 adhere to the item 574, the controller 510 can identify that the item 574 is gripped by the group of vacuum cups 541 and is ready for repositioning. If the sensors 560 include contact sensors in addition to pressure sensors, the controller 510 can also confirm that the item 574 is gripped by the group of vacuum cups 541 based on signals indicative of such contact.

At step 610, the process can include the controller 510 repositioning the panel 530 and the vacuum cups 540 to any suitable location. Here, the controller 510 can direct the robotic arm 520 to move the item 574, which is adhered to the group of vacuum cups 541, to another location for placement. Finally, at step 612, the process can include the controller stopping the vacuum of the vacuum system 500 to drop the item 574.

Figure 11:
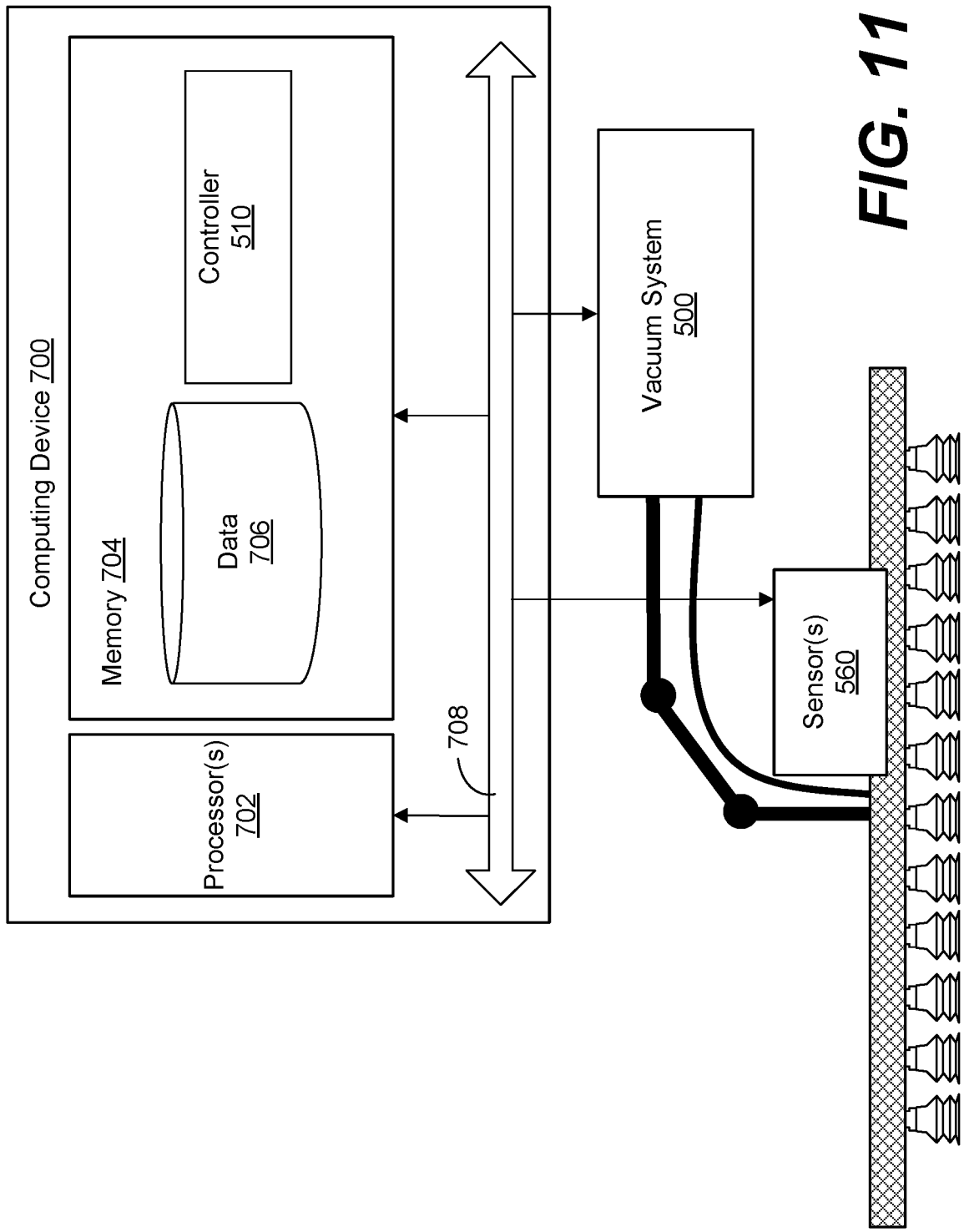
FIG. 11 illustrates an example computing device for a vacuum system according to various aspects of the embodiments of the present disclosure.

FIG. 11 illustrates an example computing device 700 for the vacuum system 500 according to various aspects of the embodiments of the present disclosure. As shown, the controller 510 and other components of the vacuum system 500 can be embodied in hardware, software, or a combination of hardware and software. As shown in FIG. 11, the computing device 700 includes at least one processing system, for example, having a processor 702 and a memory 704, both of which are electrically and communicatively coupled to a local interface 708. The local interface 708 can be embodied as a data bus with an accompanying address/control bus or other addressing, control, and/or command lines, for data communications and addressing between the processor 702, the memory 704, the vacuum system 500, and the sensors 560.

In various embodiments, the memory 704 stores data 706 and other software or executable-code components executable by the processor 702. The data 706 can include data related to the operation of the vacuum system 500, the sensors 506, and other data. Among others, the executable-code components can include components associated with the controller 510 and an operating system for execution by the processor 702. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

The memory 704 stores software for execution by the processor 702. In this respect, the terms "executable" or "for execution" refer to software forms that can ultimately be run or executed by the processor 702, whether in source, object, machine, or other form. Examples of executable programs include, for example, a compiled program that can be translated into a machine code format and loaded into a random access portion of the memory 704 and executed by the processor 702, source code that can be expressed in an object code format and loaded into a random access portion of the memory 704 and executed by the processor 702, or source code that can be interpreted by another executable program to generate instructions in a random access portion of the memory 704 and executed by the processor 702, etc.

In various embodiments, the memory 704 can include both volatile and nonvolatile memory and data storage components. Volatile components are those that do not retain data values upon loss of power. Nonvolatile components are those that retain data upon a loss of power. Thus, the memory 704 can include, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device. An executable program can be stored in any portion or component of the memory 704.

The processor 702 can be embodied as one or more microprocessors, one or more discrete logic circuits having logic gates for implementing various logic functions, application specific integrated circuits (ASICs) having appropriate logic gates, and/or programmable logic devices (e.g., field-programmable gate array (FPGAs), and complex programmable logic devices (CPLDs)).

If embodied in software, the controller 510 can represent a module or group of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. Thus, the processor 702 can be directed by execution of the program instructions to perform certain processes, such as those illustrated in FIG. 10. In the context of the present disclosure, a non-transitory computer-readable medium can be any tangible medium that can contain, store, or maintain any logic, application, software, or executable-code component described herein for use by or in connection with an instruction execution system.

Also, one or more of the components described herein that include software or program instructions can be embodied in a non-transitory computer-readable medium for use by or in connection with an instruction execution system, such as the processor 702. The computer-readable medium can contain, store, and/or maintain the software or program instructions for execution by or in connection with the instruction execution system. The computer-readable medium can include a physical media, such as, magnetic, optical, semiconductor, and/or other suitable media or drives. Further, any logic or component described herein can be implemented and structured in a variety of ways. For example, one or more components described can be implemented as modules or components of a single application. Further, one or more components described herein can be executed in one computing device or by using multiple computing devices.

The flowchart or process diagram in FIG. 10 is representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 702. The machine code can be converted from the source code, etc. Further, each block can represent, or be connected with, a circuit or a number of interconnected circuits to implement a certain logical function or process step.

Although the flowchart or process diagram in FIG. 10 illustrates a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Although embodiments have been described herein in detail, the descriptions are by way of example. In other words, the embodiments of the frame described herein are not limited to frame structures for aircraft, however, and may be relied upon as frame structures for both airborne and ground-based crafts, vehicles, etc. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A vacuum cup, comprising:
   a suction stem tube;
   a bellows fitted to an end of the suction stem tube, the bellows comprising a suction cup and at least one compressible pleated convolution, an inner chamber being formed within the bellows; and
   a valve assembly seated within the inner chamber, the valve assembly comprising:
      a valve body disk seated within the inner chamber and comprising a central valve aperture;
      a valve control disk seated between the suction cup and the at least one compressible pleated convolution of the bellows, the valve control disk comprising at least one aperture to convey fluid suction based on a vacuum through the suction stem tube when the valve assembly is open;
      a valve spring between the valve body disk and the valve control disk; and
      a valve control stem extending through the central valve aperture of the valve body disk, through the valve spring, and secured to the valve control disk.

2. The vacuum cup according to claim 1, wherein:
the central valve aperture of the valve body disk comprises a tapered central valve aperture;
the valve control stem comprises a tapered valve stop; and
the valve spring pushes the valve body disk apart from the valve control disk within the bellows, to seat the tapered valve stop of the valve control stem into the tapered central valve aperture of the valve control disk and close the valve assembly.

3. The vacuum cup according to claim 2, wherein:
based on the vacuum through the suction stem tube, a region of low pressure is maintained within the inner chamber between the valve body disk and the suction stem tube when the tapered valve stop of the valve control stem is seated into the tapered central valve aperture of the valve control disk.

4. The vacuum cup according to claim 2, wherein:
compression of the bellows moves the valve body disk toward the valve control disk, compressing the valve spring, within the bellows, to unseat the tapered valve stop of the valve control stem from the tapered central valve aperture of the valve control disk and open the valve assembly.

5. The vacuum cup according to claim 1, wherein the valve assembly further comprises:
a plurality of control disk backstops to maintain a predefined minimal mechanical interference distance, at a predefined angular orientation, between the valve body disk and the valve control disk during compression of the bellows.

6. A vacuum cup, comprising:
a suction stem tube;
a bellows fitted to an end of the suction stem tube, the bellows comprising a suction cup and at least one compressible pleated convolution, an inner chamber being formed within the bellows; and
a valve assembly seated within the inner chamber, the valve assembly comprising:
  a valve body disk seated within the inner chamber and comprising a central valve aperture; and
  a valve control stem extending through the central valve aperture of the valve body disk.

7. The vacuum cup according to claim 6, wherein the valve assembly further comprises:
a valve control disk seated between the suction cup and the at least one compressible pleated convolution of the bellows, the valve control disk comprising at least one aperture to convey fluid suction based on a vacuum through the suction stem tube when the valve assembly is open.

8. The vacuum cup according to claim 7, wherein the valve assembly further comprises:
at least one control disk backstop to maintain a predefined minimal mechanical interference distance between the valve body disk and the valve control disk during compression of the bellows.

9. The vacuum cup according to claim 7, wherein the valve assembly further comprises:
a plurality of control disk backstops to maintain a predefined minimal mechanical interference distance, at a predefined angular orientation, between the valve body disk and the valve control disk during compression of the bellows.

10. The vacuum cup according to claim 7, wherein:
the valve assembly further comprises a valve spring between the valve body disk and the valve control disk; and
the valve control stem extends through the central valve aperture of the valve body disk, through the valve spring, and is secured to the valve control disk.

11. The vacuum cup according to claim 10, wherein:
the central valve aperture of the valve body disk comprises a tapered central valve aperture; and
the valve control stem comprises a tapered valve stop.

12. The vacuum cup according to claim 11, wherein:
the valve spring pushes the valve body disk apart from the valve control disk within the bellows, to seat the tapered valve stop of the valve control stem into the tapered central valve aperture of the valve control disk and close the valve assembly.

13. The vacuum cup according to claim 12, wherein:
based on the vacuum through the suction stem tube, a region of low pressure is maintained within the inner chamber between the valve body disk and the suction stem tube when the tapered valve stop of the valve control stem is seated into the tapered central valve aperture of the valve control disk.

14. The vacuum cup according to claim 12, wherein:
compression of the bellows moves the valve body disk toward the valve control disk, compressing the valve spring, within the bellows, to unseat the tapered valve stop of the valve control stem from the tapered central valve aperture of the valve control disk and open the valve assembly.

15. A method of detecting adhesion using a vacuum system, comprising:
starting a vacuum of the vacuum system;
monitoring pressure at a location in an end tool of the vacuum system after starting the vacuum, based on a signal from a pressure sensor in the end tool;
determining that the pressure in the end tool reaches an equilibrium low pressure state;
repositioning the end tool of the vacuum system to initiate a pick of an item; and
identifying a change in the pressure from the equilibrium low pressure state for a period of time based on the signal from the pressure sensor.

16. The method according to claim 15, further comprising:
after identifying the change in the pressure from the equilibrium low pressure state, repositioning the end tool to move the item; and
stopping the vacuum of the vacuum system to drop the item.

17. The method according to claim 15, wherein:
the end tool of the vacuum system comprises a vacuum cup; and
the vacuum cup comprises a bellows and a valve assembly seated within the bellows.

18. The method according to claim 17, wherein the valve assembly comprises:
a valve body disk comprising a central valve aperture;
a valve control disk comprising at least one aperture to convey fluid suction;
a valve spring between the valve body disk and the valve control disk; and
a valve control stem extending through the central valve aperture of the valve body disk, through the valve spring, and secured to the valve control disk.

19. The method according to claim 18, wherein:
the central valve aperture of the valve body disk comprises a tapered central valve aperture; and
the valve control stem comprises a tapered valve stop.

20. The method according to claim 19, wherein:
the valve spring pushes the valve body disk apart from the valve control disk within the bellows, to seat the tapered valve stop of the valve control stem into the tapered central valve aperture of the valve control disk and close the valve assembly; and
compression of the bellows moves the valve body disk toward the valve control disk, compressing the valve spring, within the bellows, to unseat the tapered valve stop of the valve control stem from the tapered central valve aperture of the valve control disk and open the valve assembly.

\* \* \* \* \*